United States Patent [19]

Harman

[11] 4,270,073

[45] May 26, 1981

[54] POSITION CONTROL IN DISK DRIVE SYSTEM

[75] Inventor: Jefferson H. Harman, Thousand Oaks, Calif.

[73] Assignee: PerSci, Inc., Los Angeles, Calif.

[21] Appl. No.: 16,066

[22] Filed: Feb. 28, 1979

[51] Int. Cl.³ .......................................... G05D 23/275
[52] U.S. Cl. .................................. 318/632; 318/646; 360/77; 360/78
[58] Field of Search ....................... 318/632, 561, 646; 360/77, 78

[56] References Cited

U.S. PATENT DOCUMENTS

| 3,405,257 | 10/1968 | Rantsch et al. | 318/632 |
| 3,775,655 | 11/1973 | Du Vall | 360/77 |
| 3,818,502 | 6/1974 | Chien et al. | 360/77 |
| 3,827,333 | 8/1974 | Hurd | 318/632 |
| 3,916,279 | 10/1975 | Kawano et al. | 318/632 |
| 4,149,199 | 4/1979 | Chick et al. | 360/77 |
| 4,149,201 | 4/1979 | Card | 360/77 |

OTHER PUBLICATIONS

Mantey, "Offset Force Correction for Disk File", *IBM Technical Disclosure Bulletin*, vol. 21, No. 5, Oct. 1978, pp. 1792–1795.

*Primary Examiner*—S. J. Witkowski
*Assistant Examiner*—Eugene S. Indyk
*Attorney, Agent, or Firm*—Smyth, Pavitt, Siegemund & Martella

[57] ABSTRACT

A voice coil type linear motor controls the movement and positioning of a transducer which cooperates with a spinning disk. The motor is feedback controlled for separate speed (seek) and positioning modes in which respectively the transducer is moved across the disk towards a different track and is held centered above that track. In order to offset the effect of a tilted axis of carriage movement, the control condition in the positioning mode representing a correct transducer position in which it is held by the motor, is continuously sampled and held during a period when the transducer is moved to another track to be applied as correction for the control moving the transducer towards another track. This correction signal is also used in the initial phases of holding the transducer above the newly selected track, until sampling and positioning control proper takes over.

13 Claims, 3 Drawing Figures

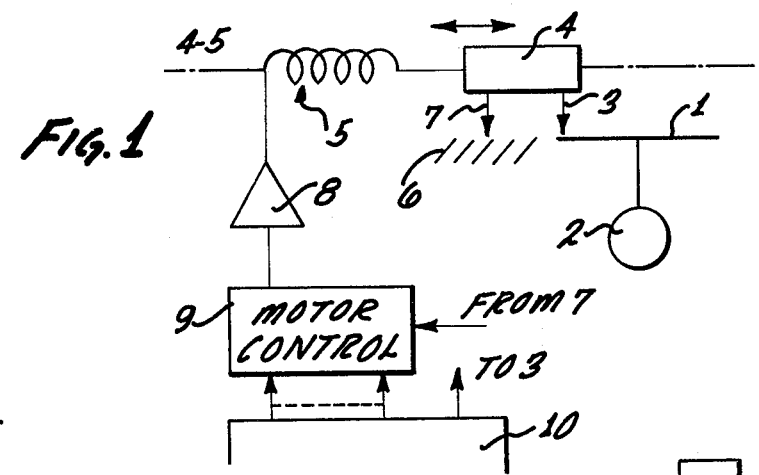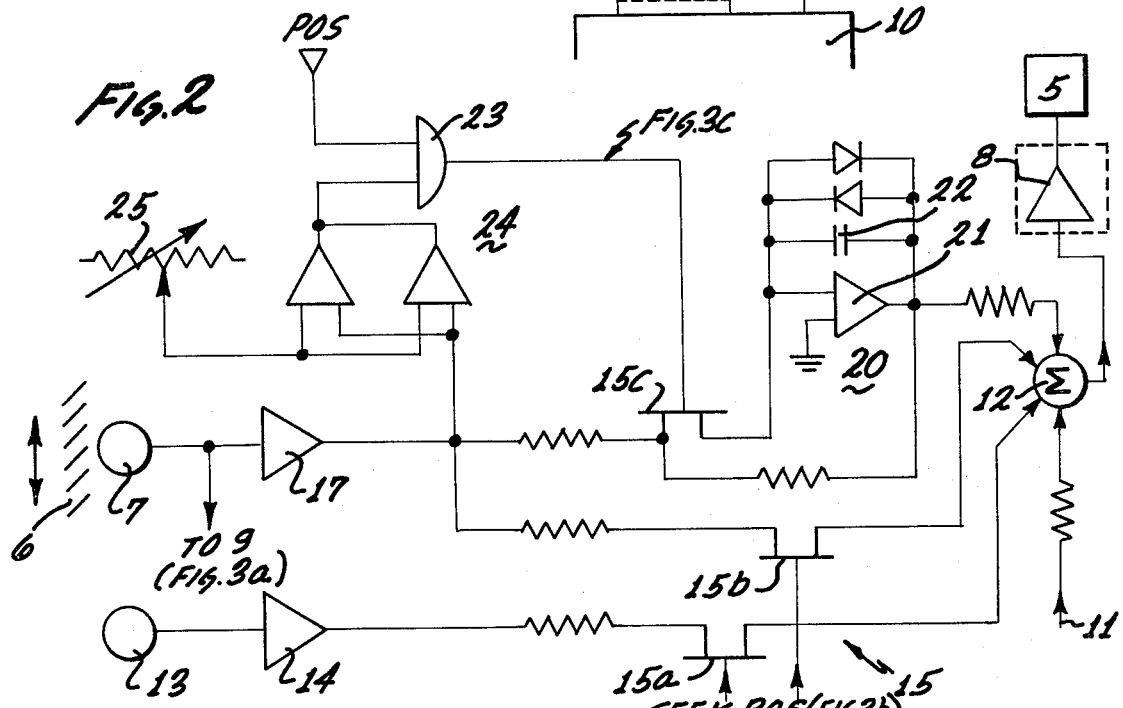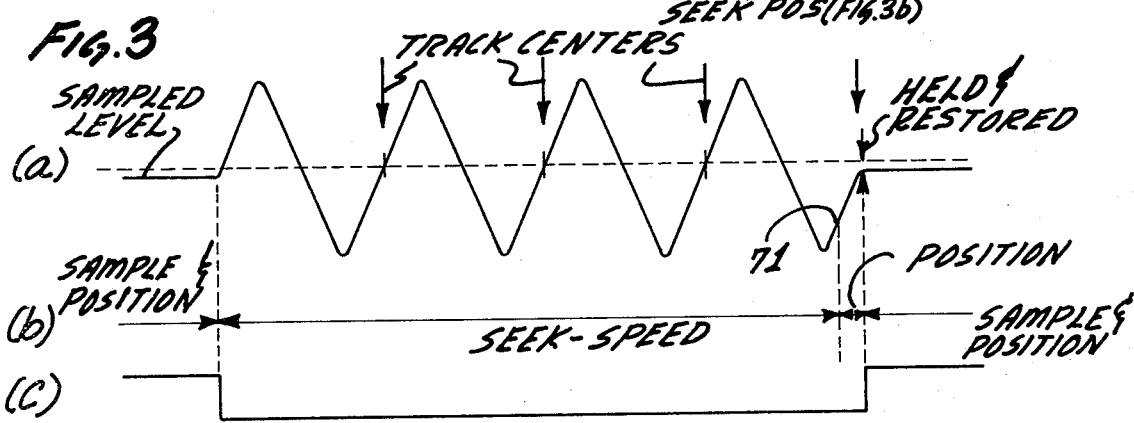

POSITION CONTROL IN DISK DRIVE SYSTEM

BACKGROUND OF THE INVENTION

The present invention relates to recording disk systems and more particularly, the invention relates to the control of positioning a transducer head precisely above any of the recording tracks of the disk in a disk drive.

Disk systems of the type to which the invention pertains are usually constructed with means for spinning a disk, e.g. a so-called "floppy" disk, about its axis. A transducer (or a pair of transducers) is mounted on a suitable mount constructed as a slide carriage or the like which is positioned by a solenoid, commonly referred to in this art as a voice coil motor. The motor is under specific control for positioning the transducer. This control involves usually two modes, operated under different conditions. In one mode, called a seek operation, the motor moves the transducer and carriage from one track to another one. This control operation may be carried out to cause the carriage to move as fast as possible, accelerating over a portion of the distance to be traversed and decelerating for the remainder. In a simplified but slower version one may include a constant speed phase. The second or positioning mode servo controls the position of the transducer above the center of the track on which it records or which it reads.

For purposes of these controls, a position sensor is provided, e.g. in the form of an optical grating representing the track positions. A detector on the carriage scans these gratings and provides a signal representative thereof. This signal is basically oscillatory in nature (though the signal contour is usually triangular rather than sinusoidal). The number of excursions or pulses sensed in this manner by the grating scanner and detector during movement of the carriage represents the number of tracks being passes across by the transducer. These pulses are often called detent pulses. The number of detent pulses is made to agree with a number externally commanded to the controller for causing the transducer to change tracks. The latter number is sometimes referred to in disk technology as cylinder difference, and the command pulses are called cylinder pulses. The detent pulses and the cylinder pulses are the inputs for the speed control of the carriage to change its track positions. The signal contour of the detector output is used directly to servo the voice coil motor so that the transducer is and remains above the selected track. Within a limited range that position signal has directly the contour of an error signal.

The servo and speed control as described is well developed, and satisfactorily working circuits are well known and incorporated in disk drives on the market. This is particularly true with regard to large disk file units, using hard surface disks, usually assembled in a horizontally oriented stack with vertical axis, and the voice coil motor and carriage axis are oriented both horizontally and on or parallel to a radial line of the disk or disks. As far as the smaller, "floppy" disk types units are concerned, I discovered the following problem.

Usually, the disk in such a unit is vertically oriented, but the voice coil motor and carriage still move on a horizontal axis. That, however, is not always the case. For some reason or another, that axis may have a vertical component, i.e. the unit is tilted. The axis may even be oriented straight up or down. It follows that the resulting force acting on the movable coil in the motor and being combined with and connected to the carriage, differs with that orientation, all other parameters remaining the same. Thus, if the control circuit for the two modes above is designed and rated to energize the motor in a particular manner, the different situations represented by different position and speed inputs will produce a definite behavior and response of the coil carriage combination only for a particular axis orientation. If the axis is differently oriented, a different gravity component will be superimposed modifying the control conditions for the carriage. Consequently, the servo conditions and particularly the accuracy and tolerances in the positioning of the transducer differ, they depend on the amount of tilt. Of course, one could trim adjust each such unit and calibrate it on the basis of the expected tilt. However, that tilt may be unforeseen at times and even vary. Moreover, such individual calibration is quite cumbersome. Recalibrating for every tilt change is outright impractical and even impossible.

DESCRIPTION OF THE INVENTION

It is an object of the present invention to find a solution to the problem outlined above and to avoid the effect tilting has on the control of a transducer head positioner in disk drive systems.

It is a specific object of the present invention to improve disk drive systems operated at times in a seek mode to move a transducer across a disk and from a position of alignment with one track to a position near a different track; subsequently that system is operated in a position mode to center the transducer above the latter track.

An obvious solution to the problem, once discovered, would be to sense tilting in some fashion and to introduce a corrective signal component into the control circuit for the voice coil motor which in some fashion offsets the effect of the tilt. For a variety of reasons, however, this solution is impractical; for example, there is no linear relationship between the tilt and the requisite correction. Moreover, this method facilitates but does not eliminate the need for particular calibration.

In accordance with the preferred embodiment of the present invention, it is suggested to sample a control condition for the transducer positioning motor when in the positioning mode; to hold that condition and derive a correction factor from it when the motor is in the seek mode; and to restore that particular control condition when the transducer has again arrived near the center of the new track. When in the positioning mode, the servo loop maintaining the on-center-of-the-track position of the transducer is in a particular, average operating state which includes, e.g. the formation of a control signal that is applied to the positioning motor maintaining that state. This control signal includes, so to speak, a component (whatever its value) necessary to offset the effect of gravity due to tilting. This control signal or a duplicate or represenatation of the gravity force is sampled preferably under conditions eliminating any variations on account of servo fluctuations. As the drive is commanded to move the transducer to a different track, that sampled signal is held, and a correction factor derived from it is fed into the velocity control compensating for the effect of gravity on acceleration, until the system has determined that the transducer has arrived very near track. Now, that sampled signal is re-introduced as control active signal component right where it was taken from, to take over the control and to establish on the drive the same conditions previously established for centering the transducer. This control action enhances the regular one; but as, unless the axis of tilt has moved, this signal was correctly held from the last time on track and settling is from the regular control action only. Thus, one avoids that in both the positioning mode and the seeking mode the system has to search in each instance for a state that does, in fact, offset the tilting. The device in accordance with the invention saves, so to speak, a representation of that state and continuously applies a correction factor derived from this held information to the control circuit so that the circuit "Remembers" the correction until it can be updated (sampled anew) at a time when errors due to moving the transducer from one track to the next have disappeared.

In practice, the sample and hold circuit operates with a slow response but has a high gain to establish the requisite motor control on the basis of a small residual error and is effective in a small error signal range. Fluctuations in the position on account of other disturbances are servo controlled on the basis of the regular, lower gain fast response position servo loop.

Generally speaking, as a further object of the invention, the control loop for positioning control in accordance with the present invention includes a high gain, slow response and low bandwidth, proportional branch operating for a very small range of deviations from a normal position as sensed by position and error signal feedback means; parrallelly thereto operates a low or moderate gain, fast response at higher bandwidth, proportional branch operating over a larger range of deviations. The first branch establishes control conditions offsetting permanent or long lasting interferences, the second branch eliminates fluctuations. In addition, the operation of the first branch is sampled, and the respective latest sample will be held over periods in which the desired position changes during which that sample is used as basis and corrective factor compensating the effect of tilt. After the new desired position has been reached that previous sample is still used at first to define the desired position control, and the sample will be updated thereafter while the new position is held.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a block diagram of a disk drive system to be improved in accordance with the invention;

FIG. 2 is a more detailed block and circuit diagram of a portion of the system shown in FIG. 1, and incorporating an example for the preferred embodiment of the invention; and FIG. 3 is a signal diagram for signals as they occur in the circuit shown in FIG. 2.

Proceeding now to the detailed description of the drawings, FIG. 1 is shown here for purposes of background and orientation only. The figure illustrates schematically a disk drive system which includes a flexible disk 1 driven for continuously spinning about its center by means of a constant speed motor 2. A transducer 3 on a carriage 4 is moved on an axis 4–5 by means of a voice coil motor 5 in direction of the double arrow which is radial with respect to the disk 1.

The linear motor 5 positions the magnetic transducer 3 vis-a-vis the disk 1, and in particular positions relative thereto. These positions define the tracks on the disk. The track pattern and position is represented by a stationary grating 6 which is scanned by a transducer, pick-up or detector 7, being also mounted on the carriage 4. However, it makes no difference in principle whether grating 6 is stationary and detector 7 is on the carriage or vice versa.

The motor 5 is controlled via amplifier means 8 from a control circuit 9. This control circuit 9 receives a plurality of inputs from a control unit 10 via an interface. The control unit, in turn, is connected to a computer, minicomputer, processor, etc. The inputs for control circuit 9 provide generally particular control and command signals such as the command "seek" accompanied by identification of the new track and by the number of tracks (cylinder difference) and the direction in which the carriage is to be moved. Arrival in the approximate vicinity of the new track is usually signaled back to the control unit 10 as a seek-complete signal, whereupon the control unit 10 drops the seek command.

The unit 10 furnishes the number of tracks (cylinder difference) to be traversed as a sequence of pulses, also called cylinder pulses. Circuit 9 receives additionally feedback pulses and signals from transducer 7, also called detent pulses, and generates a velocity profile for causing the motor 5 to move across the desired number of tracks. Commensurate with the control task, circuit 9 provides to motor amplifier 8 a signal which represents the velocity profile causing the carriage at first to accelerate and later to slow down to a near stop fairly close to a position in which transducer 3 is aligned with the desired track. Having done so, transducer 7 provides a positioning feedback in that for the position control range the transducer output signal is directly proportional (at the proper polarity) to any misalignment in relation to the grating 6. Particularly, an on-center position of transducer 3 may be associated with a position of transducer or detector 7 above grating 6 so that the output of this detector is zero, and becomes positive or negative depending on the direction of any deviation in the position of the transducer 3. After transducer 3 has arrived near the new track, the fine control and position feedback takes over to place the transducer into exact alignment and hold it there for as long as that particular position is to be maintained.

As was outlined in the introduction, this control operation is, in fact, interfered with if the carriage and motor axis 4–5 is tilted. While in a true horizontal disposition control and servo operation are precisely symmetrical for moving the carriage and transducer 3 from track x to track y or for moving the transducer from track y to track x. Any asymmetry on account of component asymmetry has been considered on calibration. If the axis is tilted, the control operation for the two cases is no longer symmetrical; it takes a larger force to move the carriage "uphill", while "downhill" motion is easier and prone to overshoot as gravity is added to the moving force. Moreover, it takes a particular non-zero force to the hold the transducer 3 in proper alignment when the axis 4–5 is tilted, against the force of gravity.

FIG. 2 illustrates a circuit constructed in accordance with the preferred embodiment of the invention which automatically offsets the effect of the tilt of the motor and the carriage. This figure shows again the voice coil motor 5 and its driving amplifier circuitry 8; also shown is the grating 6 cooperating with the transducer, which may be an optical detector 7. The detector 7 is connected to amplifier circuitry 17 and produces an output signal which, for example, has the contour as shown in FIG. 3, row a.

Ideally, this signal is zero or near zero when the transducer 3 is exactly above the center of the desired track. Positive or negative signal levels and/or excursions denote deviations from that position. The proportionality between deviation from track center position and signal level, of course, holds true only for a little less than one quarter grating or track-to-track spacing. The up and down excursions result from movement of the motor driven carriage as the detector 7 passes the grating. The periodicity in the signal reflects the periodicity of the track positions across the disk. In the illustrated signal contour, a zero crossing of the detector output (FIG. 3, row a) from a down swing towards an up swing may represent the center of a track. The zero crossing of a reverse swing may represent the radial center between two tracks. This is quite arbitrary but must remain consistent.

The circuit shown in FIG. 2 includes the following elements which will be explained in the order of function during a regular seek operation, when the drive is commanded to place its transducer 3 above a different track. As denoted schematically by line 11, the controller 9 provides in the regular fashion a velocity profile, based on the cylinder pulses it receives and based further on the number of detent pulses derived from the transducer 7. The resulting signal is a speed command signal fed to a summing point 12 which, in turn, drives the motor 5. Basically, this speed command signal increases with the number of cylinder pulses and decreases with the number of detent pulses. When these numbers equal, the motor should stop.

Superimposed upon the speed command signal is a negative speed feedback signal derived from a transducing device 13, representing a generator which provides a signal that is proportional to the speed of the carriage. The device 13 may be a tachometer or a transducing structure such as an optical pick up which scans a wedge-like grating (see e.g. U.S. Pat. No. 4,125,882). This speed depending signal is duly amplified (amplifier 14) and added at inverse polarity as compared to the speed profile signal, to the summing point 12. The speed profile together with the feedback signal will cause the motor to accelerate at first, but later, when detent pulses signal back speedy movement of the voice coil motor, the profile signal will drop and the combined profile and feedback signal reverses polarity to slow the motor down. When the detent pulses produced equal in number to the previously received cylinder pulses, the motor should stop.

The feedback signal from devices 13, 14 is passed through a branch of a multiplexing unit 15, branch 15a. This gated branch is kept open for the duration of the seek mode or velocity or speed mode. Generally speaking, this mode is maintained until the number of detent pulses equals the number of cylinder pulses, indicating that the transducer 3 is approaching the desired track. The circuit 9 (or 10) now drops to "seek" signal as a gating signal for gate 15a, and terminates the velocity mode.

It is a particular aspect of this invention that the speed mode or track seek mode and the settling to track are carried out with a correction for the tilt situation which was determined when the transducer was very near track center; hence the correction was not disturbed by the dynamic performance of the transducer as shown in waveform a of FIG. 3. The carriage, in the absence of the correction, when commanded to move downhill would move a little faster; but the correction precisely compensates for this. The same, of course, is true for the uphill case. True enough, after power turn on or immediately after a change in tilt some time is required for the correction to stabilize; but these are infrequent occurences and this time is generally available. It should be noted that the time to move from one track to the next is relatively short, being limited by the time to travel from one location to the next desired location. This limits the time that the tilt correction must be held; while the length of time the transducer can be over a track is unlimited, thus, in general giving adequate time for the high gain low bandwidth sampling circuit to settle.

The regular position mode is entered after the velocity mode has been completed as stated, and gate 15a is blocked. The velocity profile command in line 11 is zero at this point and does not have to be blocked. This situation occurs specifically when the output signal of position transducer 7 is on a linear branch following a negative excursion and approaches a zero crossing which represents the correct position of transducer 3 above the center of the desired track (see point 71 in FIG. 3a).

The multiplexing branch 15b now couples the output amplifier 17 for the transducer 7 to the summing point 12. The gate 15b operates in response to a position mode signal which may be established automatically when the system is no longer in the seek mode. At that point, regular position servo takes over, continuing to bring the transducer to the center of track. When the transducer is very near the center of track, so that errors due to movement have virtually settled, the sample and hold in the tilt correction circuit is switched to continuously sample the output of amplifier 17, thus updating the correction.

Turning now to the tilt correction circuit portion, its primary component is a high gain sample and hold circuit 20, which is also connected to amplifier 17 to receive the position error signal. The connection leads to another gate of the multiplexing circuit, 15c, and includes a high gain amplifier circuit 21 and a hold capacitor 22 connected across input and output of the amplifier.

The amplifier 21 boosts the gain of the position signal, e.g. fourfold. The output of amplifier 21 is another input for the summing point and, when effective, enhances the regular position control as applied via branch gate 15b. In other words, amplifier 21, when effective, provides a larger corrective signal to summing point 12 for the same error signal. The error signal vs. summing point characteristics is steeper in this branch than in the regular position control branch via gate 15b. However, this sample and hold branch is not always effective in the position mode.

The gate 15c is controlled by a gate 23, e.g. and AND gate or a gate of analogous function which receives also the position mode signal that activates gate 15b. Gate 23 is restricted for response by another signal derived from a comparator device 24 which are two very high gain differential amplifiers each switching essentially between two output levels interpreted as logic signals.

The comparator device 24 receives the signal from position signal amplifier 17 and compares it with a reference signal derived, e.g. from a potentiometer 25 or from any other suitable source for such a reference signal. The comparator device 24 is constructed to be, e.g., low whenever the position error signal from amplifier 17, positive or negative, is indicative of the fact that the transducer 3 is more than a particular distance off center, say, more than a thousandth of an inch (about 1/25 of a millimeter). The output of comparator device 24 is high when the transducer is less than that distance off the track center, positive or negative. Thus, gate 23 will respond only after the transducer 3 has moved into the ±0.001" range, opening the gate 15c so that this branch enhances the gain for low frequency disturbances, e.g., tilt. In other words, as soon as transducer 3 is very close to the desired track position, this high gain servo loop with branch 15c enhances the gain, but only then. However, and this is the most important aspect, this branch does not become inactive on the transducer moving from the ±0.001" range. Rather, the error signal developed while in this range is stored by the sample and hold and continues to be applied while the transducer is being moved from one track to the next. The significance thereof will be developed next.

During any position mode as restricted by gate 23, sample and hold circuit 20 is on line and samples the output of transducer 7. The response of the circuit 20 is quite slow, i.e., it does not respond to the residual settling transient, but applies the low frequency component position feedback at a high gain to summing point 12. The high gain characteristic controls the motor 5 to hold transducer 3 in the central position in which the transducer 3 is approximately above the respective track. Outside of the ±0.001" position range the sample and hold amplifier 21 is switched via multiplexing circuit 15C to the hold mode storing in the hold capacitor 22 the amount of correction that was needed to bring the transducer accurately to track center. The correction that developed enough force to restore the positioner to track center while operating on a tilted axis will also develop precisely the compensating force to equalize the acceleration from uphill to downhill on this same tilt, both forces being the force that gravity exerts against the moving mass.

Any corrective operation and position is continuously interfered with by gravity when the axis 5-4 (FIG. 1) is tilted. Even when there are no other disturbances, gravity still tends to pull the carriage and transducer 3 away from the on-center position. The high gain-slow response loop of branch 15c, however, stabilizes the transducer in a desired position. Maintaining this position requires a residual error, i.e., a non-zero position error signal because the motor must receive a non-zero energizing current to offset the force of gravity acting upon it. However, due to the high gain of this loop, this small error signal represents a very small deviation of the transducer 3, well within the permitted tolerance of deviation. Depending upon any other interference, the two servo loop branches will bend to stabilize the operation continuously so that the particular state in which the sample and hold circuit, now in the sample mode, samples, and, in fact, maintains that signal level needed to hold the carriage stable and on center.

If now the unit commands a seek operation, the gate 23 goes false and blocks gate 15c. Thus, the sample circuit 21 shifts from the sample to the hold mode. As stated, it holds a signal having a level which is exactly the requisite control signal level for holding the tilted carriage against gravity, so that the transducer 3 is on the average above track center within the tolerances of residual error (being less than 1/1000 of an inch). Now, the seek operation proceeds (see FIG. 3) until completed, followed by a change over to the position mode at low gain (branch 15b), compensated in both seek and low gain position mode by the correction remembered from the last time the transducer was held on track. Any overshoot or undershoot of the gravity influenced carriage is minimized. As soon as the transducer 3 is again within the ±0.001" range, the sample and hold circuit 20 applies the correct control signal level to the summing point 12 for enhancing the holding of the motor in the desired position. That signal level represents the force needed to be exerted by the motor 5 upon the carriage to hold the transducer against the force of gravity.

The output signal of circuit 21 will be, of course, updated by the true position signal to offset any other disturbances, but the response is relatively slow. Nevertheless, the circuit also operates as regular position servo. The regular position control loop (branch 15b) remains on line and responds relatively fast to larger disturbances, so that the position remains tracked at the desired rate. Thus, two branches 15b, 15c coact by a combined response characteristics having low gain but fast response for larger but transient errors and high gain for smaller but persistent errors, the latter, of course, including the persisting force of gravity.

The high gain sample circuit 20, responding and sampling relatively slow will continue to sample the average level needed to maintain the transducer in or near the desired position. In that sense, amplifier circuit 21 fulfills two functions, one is to provide and maintain a high gain narrow range position stabilizing operation responding particularly to long lasting disturbances while the transducer is being held very near track center, and remembering how much correction was applied to offset these long term disturbances to apply as a correction to the accelerating and decelerating force when moving the transducer from one track to the next desired track. Thus, if a new command for changing tracks reaches the unit, that level is again held until the new track can be centered on.

The invention is not limited to the embodiments described above but all changes and modifications thereof not constituting departures from the spirit and scope of the invention are intended to be included.

I claim:

1. In a disk drive system having a spinning disk; at least one transducer for cooperation with the disk in any of plural concentric tracks;
   a linear motor for moving and positioning the transducer radially along a particular axis and in relation to the disk;
   position feedback means for monitoring the position of the transducer in relation to the disk and providing a signal representative thereof;
   a control circuit connected to and incorporating the feedback means for controlling the motor;
   the improvement for offsetting the effect of tilting of said axis, comprising:
   a relatively high gain sample and hold circuit connected to the feedback means and being responsive to the position signal; and
   circuit means for causing the sample and hold circuit to stop sampling and to hold the most recently sampled value upon command execution by the control circuit to move the transducer to a different track, and to apply the held value to the control circuit to be directly effective for motor control while the transducer moves towards said different track for compensating the effect of gravity on the transducer as moved and positioned by the motor, sampling resuming after the transducer has arrived above said different track.

2. The improvement as in claim 1, the circuit means including gate means connected for enabling the sample and hold circuit in response to a signal indicative of substantial completion of a change in track selection for cooperation with the transducer; and further including comparator means connected to compare a position signal as provided by the feedback means with a reference signal, to restrict response of the gate means for said enabling to a narrow range of misalignment of the transducer in relation to the center of the said different track.

3. The improvement as in claim 1, said control circuit including a summing point means receiving from the feedback means position feedback signals, there being speed feedback means responsive to the speed of the motor and connected to provide a speed signal to the summing point, the sample and hold circuit constituting a separate branch for position control at a higher gain, independent from the position feedback means, the value being sampled being the signal level as effective on the summing point.

4. The improvement as in claim 1, the feedback means including transducer means providing a position responsive signal; the control circuit including a summing point means providing a control signal for controlling said motor; the feedback means as incorporated in the control circuit including second circuit means for connecting the transducer means to the summing point; the summing point receiving additional signals for motor speed control, the first mentioned circuit means including gate means connected to the transducer means to be responsive to the position responsive signal and to a reference signal for providing a sample control signal that restricts sampling to a small range of deviations of the position of the transducer from the center of a track.

5. The improvement as in claim 1, the control circuit including a first branch for speed control of the motor, and a second branch for position control of the motor, the sample and hold circuit being connected in the second branch to sample a position signal, the circuit means causing the sample and hold circuit to stop sampling when the speed control branch is effective thereby using the latest sampled and how held signal in the speed control branch as gravity offset.

6. In a disk drive having a spinning disk, at least one transducer for cooperating with said disk in any of plural concentric tracks;
a linear motor for moving and positioning the transducer radially in relation to the disk respectively across the tracks and in cooperating position above any of the tracks;
a control circuit for the motor including circuit means responding to control conditions at a control input to be effective on the motor, the improvement comprising:
sample and hold means connected to monitor and sample a control condition under which said motor holds the transducer above the track; and
circuit means operating the sample and hold means to hold said control condition during a change in the track position, said sample and hold circuit applying the held value to said control input while the transducer moves towards another track and until the transducer has arrived above said other track, the sample and hold means resuming sampling thereafter.

7. The improvement as in claim 6, said control circuit including a signal point for a signal to be used to control said motor, said sample and hold circuit being connected to said signal point to sample the signal level at said signal point and to hold its value during track changing operation, said control circuit providing other control signals to said control input during track changing operations and providing the held value as compensating signal to said control input.

8. The control circuit and improvement as in claim 6, the control circuit including a first branch for speed control during a change in the track position, and a second branch for position control of the motor, for retaining the transducer above a track, said branches both connected to the control input, said sample and hold means being included in the second branch for sampling and holding the sampled control condition and applying it as correction to said control input during periods in which the first branch controls repositioning of the transducer.

9. The circuit as in claim 8, the second branch including a first portion of high gain and slow response, this portion including the sample and hold means and being effective for a first narrow range of deviations from the position above the track, the high gain output of the first portion being sampled by the sample and hold means;
the second branch including a second portion of low gain and fast response and being effective for deviations larger than in said first range, the held value being used already as a control offset when the second portion controls the control input for such deviations.

10. In a disk drive having a spinning disk; at least one transducer for cooperating with said disk in any of plural concentric tracks;
a linear motor for moving and positioning the transducer radially in relation to the disk respectively across the tracks and in cooperating position above any of the tracks;
a control circuit for the motor controlling the moving and positioning of the transducer, the improvement comprising:
first circuit means connected to be responsive to a signal representation of the force needed to hold the transducer in center or near center position above any of the tracks, the first circuit means holding the representation when the control circuit causes the transducer to move across the tracks towards a center position above a different track;
second circuit means for introducing the signal representation into the control circuit to thereby compensate the control by the force needed to hold to the center of a track while the transducer is moved towards said different track.

11. The improvement as in claim 10, said first circuit means being a slow response sample circuit, responding to an average signal level in the control circuit.

12. In a positioning device wherein a motor positions a carriage in particular relationship, the relationship being represented by a feedback signal at least approximately proportional to a deviation of the carriage position relative to a desired position, the improvement comprising:
- a signal summing point producing an output controlling the motor;
- a first, high gain slow response circuit connected to be responsive to said feedback signal over a first narrow range of deviations and applying a high gain output to said summing point;
- means included in the high gain circuit to sample the said high gain output and holding it when the first circuit is disabled as to applying its output to the summing point so that the previously sampled and now held high gain output is then applied to the summing point; and
- a second, low gain fast response circuit also connected to be responsive to said feedback signal over a larger range than the first range and applying its low gain output to said summing point, while said held output is also applied thereto.

13. In a positioning device as in claim 12, including additionally a motor speed control circuit connected so that said held signal is effective as compensating signal during repositioning of the carriage.

* * * * *